July 6, 1965 J. W. GIFFEN 3,193,367
GLASS FORMING AND SHEARING
Filed Sept. 25, 1961
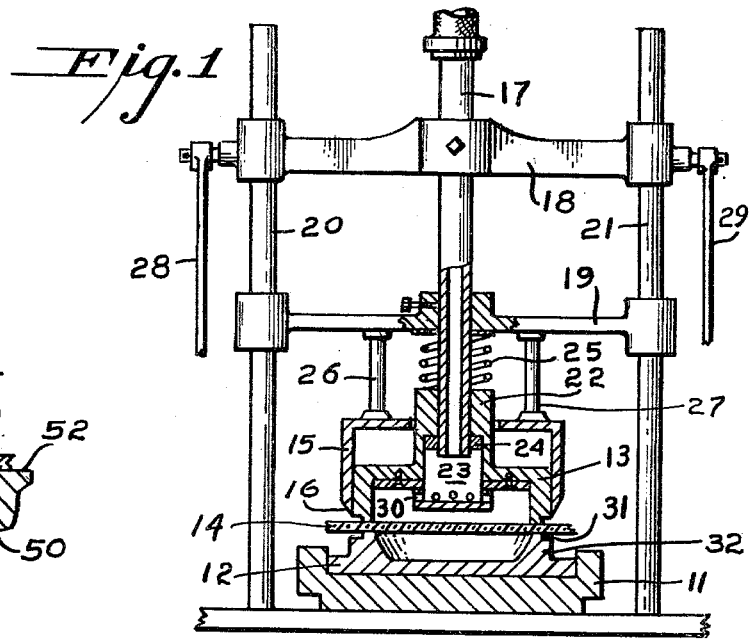
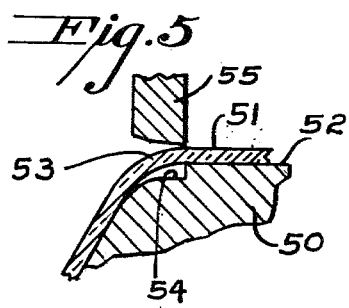
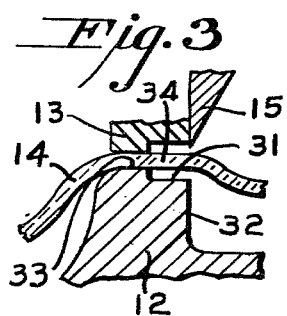
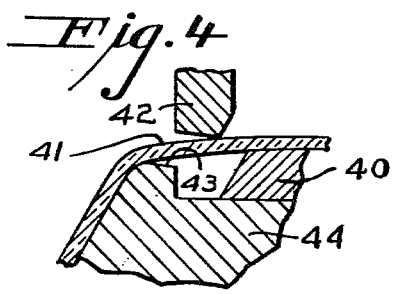
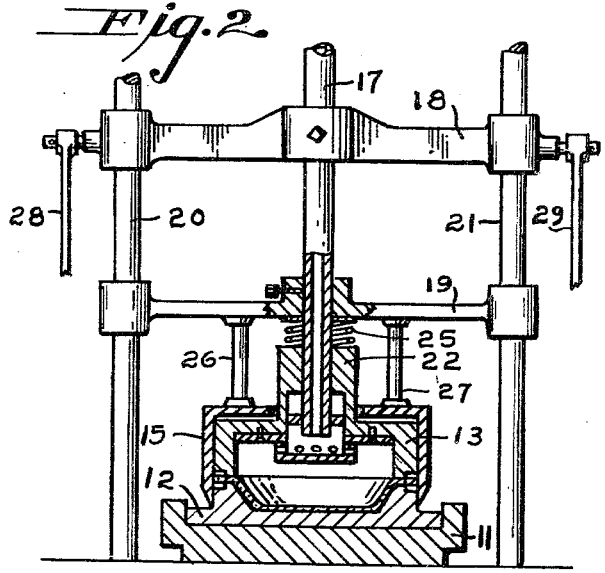
INVENTOR.
JAMES W. GIFFEN
BY Clarence R. Patty, Jr.
ATTORNEY

United States Patent Office 3,193,367
Patented July 6, 1965

3,193,367
GLASS FORMING AND SHEARING
James W. Giffen, Corning, N.Y., assignor to Corning Glass Works, Corning, N.Y., a corporation of New York
Filed Sept. 25, 1961, Ser. No. 140,531
3 Claims. (Cl. 65—70)

The present invention relates to glass forming and particularly to an improved method of and apparatus for the production of a glass article from a sheet of molten glass arranged over a forming die from about which glass of the sheet is severed by a shearing element movable into shearing relation with respect to a cavity bordering portion of its wall. Exemplary systems are disclosed in Hancock Patent No. 1,513,756 and Giffen Patent No. 2,970,405.

As will be appreciated, when a sheet or ribbon of molten glass is arranged over dies, such for example as illustrated in the above patents, the top surface of the die wall supporting the ribbon extracts heat therefrom thereby causing a rigid skin to be formed in the supported region of the ribbon and therefore, irrespective of how quickly the shearing operation is carried out, the separation of such skin is a crushing operation. Such crushing operation creates microscopic fissures in the article edge which must be remelted not only to produce a satisfactorily appearing edge surface, but also to prevent such fissures from propagating into the body of the article and thus rendering it useless. It is therefore desirable that the shearing operation be carried out with a minimum possible delay after engagement of the sheet along the shear line with the die wall.

According to the invention, the region of the sheet immediately inward of the shear line is kept out of engagement with the die wall so that it does not have heat extracted from it by the die. This is accomplished, by way of example, by providing a step transversely of the top of such wall with the region inward of the shear line being at a lower level than the region thereof upon which the ribbon is supported. Such a structure may even prevent appreciable contact of the ribbon with the bordering edge of the die until shearing is taking place and result in the layer of glass that is severed by the described crushing action to be extremely thin. In any case when the shear line region of the ribbon engages the shearing edge of the die wall, there always remains an annular ring of the sheet that bridges the region immediately inward thereof and that accordingly is not chilled so that the glass along the shear line is readily reheated by the hot glass of such annular ring and erases any minor fissures that have resulted from the shearing operation.

For a better understanding of the invention reference is now made to the accompanying drawing wherein:

FIG. 1 is a front elevation of a glass forming apparatus, partly in section, embodying the invention and showing an unformed molten sheet of glass associated therewith.

FIG. 2 is a view similar to FIG. 1, but showing the apparatus in its alternative position with the sheet formed and trimmed.

FIG. 3 is an enlarged sectional view of a fragment of the apparatus shown in FIGS. 1 and 2 and a fragment of a molten sheet of glass associated therewith.

FIGS. 4 and 5 are views similar to FIG. 3, but showing alternative structural arrangements.

In the drawings above briefly described, the numeral 11 designates an appropriate base supporting a die 12 whose upper face is here shown as formed with a cavity into which the hot pliable sheet of glass 14 is forced by fluid under pressure, for the purpose of forming any desired configuration into such sheet.

The numeral 13 designates a blow-head movable toward and from the die 12 and adapted to contact with the glass sheet 14, so that when fluid pressure is admitted to the blow-head, the sheet will be forced into conformity with the cavity bordering wall surface of the die. The sheet 14 as will be understood and as shown, projects over the vertically disposed bordering edge of the wall of die 12, and for the purpose of trimming the sheet about such edge there is provided an edge trimmer 15, which surrounds the blow-head. The cutting edge 16 of trimmer 15 is normally spaced upwardly from the bottom of the blow-head 13 which comes to rest as soon as it is lowered into contact with sheet 14, as illustrated in FIG. 1, whereas the trimmer continues to be lowered and thus trims the edge of the sheet as illustrated in FIG. 2.

As illustrated, a common activating means is provided for both the blow-head 13 and the edge trimmer 15, including a tubular activating plunger 17 through which fluid can be supplied to the interior of blow-head 13. Plunger 17 has cross-heads, 18 and 19 respectively slidable upon suitable guides 20 and 21. As shown, blow-head 13 is provided with an upstanding hollow boss 22 into the cavity 23 of which the lower end of plunger 17 slidably passes. Withdrawal of plunger 17 from cavity 23 is however prevented by a suitable stop 24. A coiled spring 25 surrounds the plunger 17 between the cross-head 19 and the boss 22 and acts to move the blow-head 13 downwardly when the plunger descends, but at the same time serves to permit further lowering of the plunger 17 when the blow-head has come in contact with the sheet 14. The additional movement of the plunger 17 is utilized to operate the edge trimmer 15 through the medium of vertically disposed rods 26 and 27 rigidly connecting the edge trimmer 15 with the cross-head 19. As a simple means of operating the plunger 17 there has been shown pitman rods 28 and 29 connected with the ends of cross-head 18 and operable by suitable eccentrics, not shown. Air is supplied to the interior of the blow-head 13 via passages such as 30.

As will be observed from the showing in FIGS. 1 and 3 the top surface area 31 adjacent the die wall surface 32 is at a lower level than the sheet supporting surface 33 immediately inward thereof and the sheet 14 is thereby prevented from contacting surface area 31 other than its bordering edge, and may not even contact the outer edge of such surface until forced into contact therewith by the trimmer. In any case, since the annular region 34 of the sheet bridges at least most of the surface area 31 it retains sufficient heat of formation within the boundary of the shear line to remelt the trimmed edge and thus erase microscopic fissures that result from the trimming operation.

Although heat loss in the annular region 34 of the sheet is illustrated in FIGS. 1–3 as prevented by giving a stepped surface to the top of the die wall such that the die border edge is at a level below and separated from the sheet supporting surface 33, similar results can be obtained by providing a fence such as 40 (FIG. 4) around the die border edge outwardly spaced therefrom and at a height above the bordering edge of the die wall to maintain an annular region 41 of the glass sheet out of contact with die surface 43 immediately inward of the shear line and prevent heat loss from the sheet until the trimmer 42 engages the sheet and forces it into engagement with the top surface 43 of the die 44.

FIG. 5 illustrates a die 50 wherein the sheet of glass 51 is supported on the die surface 52 bordering its cavity and serves much as does the fence 40 to prevent the annular region 53 inward of the shear line from contacting the die surface region 54 until after the trimmer 55 has functioned.

From the foregoing it will be understood that the invention resides primarily in the concept of methods of operation wherein residual heat is retained in an article along the region immediately inward from its sheared edge so that such heat is available to reheat such edge to immediately stop propagation of any fissures imparted to the sheared edge of the article, and in structural arrangements suitable for carrying out such methods.

What is claimed is:

1. An improved method of shearing a sheet of molten glass which retards the formation of edge fissures by minimizing the heat extracted from the sheet adjacent the shear line prior to shearing comprising, supporting a sheet of molten glass to be shear-trimmed upon the upper edge of a die, suspending a border portion of such sheet in the ambient atmosphere adjacent a trimming edge of such die to inhibit heat extraction therefrom by the die, and shear-trimming the sheet along the trimming edge while permitting the residual heat from the border portion to re-fuse any minor fissures which may have resulted from the trimming operation.

2. An improved method as defined in claim 1 wherein an outer annular border portion of relatively hot glass as compared to that in contact with the upper edge of the die is maintained in a suspended position radially-outwardly about the upper edge of such die after shearing to reheat the shear line and remove surface defects which may have been formed during the shearing operation.

3. An improved method of supporting and shearing a sheet of molten vitreous material to retard the formation of edge fissures and provide an article with smooth, flawless edge portions which comprises, supporting a molten sheet of glass material upon the upper edge of a die, suspending a border portion of such sheet within the ambient atmosphere over a trimming edge of such die so that the residual heat of formation of such border portion will be relatively higher than that portion of the sheet in contact with the upper edge of the die, shear-trimming the sheet along a shear line provided by such trimming edge to form an article, and utilizing the residual heat of formation of such border portion to reheat the edge portions of such article and cure any surface defects which may have resulted from the shearing operation.

References Cited by the Examiner

UNITED STATES PATENTS

| 1,513,756 | 11/24 | Hancock | 65—177 X |
| 1,671,548 | 5/28 | Schlitzer | 65—105 |
| 1,880,858 | 10/32 | Davis | 18—19 |
| 2,270,187 | 1/42 | Dulmage | 18—19 |
| 3,007,201 | 11/61 | Brummer | 65—117 X |

DONALL H. SYLVESTER, *Primary Examiner.*